(12) United States Patent
Morford

(10) Patent No.: US 9,932,121 B2
(45) Date of Patent: Apr. 3, 2018

(54) TURBOMACHINE FLOW STABILITY ENHANCEMENT DEVICE CONTROL

(75) Inventor: Stephen A. Morford, Marlborough, CT (US)

(73) Assignee: United Technologies Corporation, Farmington, CT (US)

( * ) Notice: Subject to any disclaimer, the term of this patent is extended or adjusted under 35 U.S.C. 154(b) by 1555 days.

(21) Appl. No.: 13/530,187

(22) Filed: Jun. 22, 2012

(65) Prior Publication Data

US 2013/0343864 A1 Dec. 26, 2013

(51) Int. Cl.
*F04D 29/56* (2006.01)
*B64D 33/02* (2006.01)
*F02C 7/04* (2006.01)

(52) U.S. Cl.
CPC ............. *B64D 33/02* (2013.01); *F02C 7/04* (2013.01); *B64D 2033/0226* (2013.01); *F05D 2270/17* (2013.01)

(58) Field of Classification Search
CPC .................. B64D 2033/0226; B64D 33/02
See application file for complete search history.

(56) References Cited

U.S. PATENT DOCUMENTS

| 4,047,381 | A | 9/1977 | Smith |
| 4,294,069 | A | 10/1981 | Camp |
| 4,414,807 | A | 11/1983 | Kerr |
| 5,275,528 | A | 1/1994 | Freeman et al. |
| 5,448,881 | A | 9/1995 | Patterson et al. |
| 6,141,951 | A | 11/2000 | Krukoski et al. |
| 6,438,960 | B1 | 8/2002 | Jaw |
| 6,473,705 | B1 | 10/2002 | Conners |
| 7,246,003 | B2 * | 7/2007 | Loda ................. F02C 9/00 455/426.2 |
| 8,192,147 | B2 * | 6/2012 | Haas ..................... 415/144 |
| 8,640,986 | B2 * | 2/2014 | Surply et al. ............ 244/53 B |
| 2002/0134891 | A1 * | 9/2002 | Guillot et al. ............ 244/199 |
| 2008/0112799 | A1 * | 5/2008 | Winter et al. ............ 415/145 |

(Continued)

FOREIGN PATENT DOCUMENTS

| EP | 0934878 | 8/1999 |
| EP | 1928216 | 6/2008 |

(Continued)

OTHER PUBLICATIONS

International Preliminary Report on Patentability for International Application No. PCT/US2013/043974 dated Dec. 31, 2014.

(Continued)

*Primary Examiner* — Logan Kraft
*Assistant Examiner* — Jason Fountain
(74) *Attorney, Agent, or Firm* — Carlson, Gaskey & Olds, P.C.

(57) ABSTRACT

An example method of controlling a flow enhancement device includes providing a flow enhancement device that is configured stabilize a flow of air near a nacelle. The flow enhancement device has a first setting and a second setting that provides more stabilization than the first setting. The method includes monitoring parameters of a turbomachine to determine the stability of the flow of air near the nacelle. The method also adjusts the flow enhancement device between the first setting and the second setting based on the monitoring.

18 Claims, 2 Drawing Sheets

(56) References Cited

U.S. PATENT DOCUMENTS

2009/0060704 A1* 3/2009 Hurwitz et al. ............... 415/1
2009/0155046 A1   6/2009 Haas
2009/0245997 A1  10/2009 Hurwitz et al.
2010/0163677 A1   7/2010 Rocklin et al.
2010/0269512 A1  10/2010 Morford et al.

FOREIGN PATENT DOCUMENTS

EP   1988266   11/2008
EP   1998027   12/2008
EP   2034159    3/2009

OTHER PUBLICATIONS

International Search Report for International Application No. PCT/US2013/043974 dated Aug. 27, 2013.
Supplementary European Search Report for Application No. EP 13807726 dated Jul. 29, 2015.

* cited by examiner

TURBOMACHINE FLOW STABILITY ENHANCEMENT DEVICE CONTROL

BACKGROUND

This disclosure relates generally to flow stability enhancement devices for turbomachines. More particularly, this disclosure relates to controlling operation of the flow stability enhancement devices.

Air typically moves into a turbomachine through a nacelle. The air passes through a fan section of the turbomachine and is then compressed and combusted. The products of the combustion are expanded to rotatably drive a turbine section of the turbomachine.

As known, the turbomachine can become damaged if air moving into the turbomachine is unstable and has a substantially uneven air pressure distribution. The fan section is particularly prone to such damage. Accordingly, the nacelles of many turbomachines have a geometry that stabilizes and smoothes uneven air pressure distributions. Such nacelles are designed to passively influence air pressure distributions. That is, the geometry of the nacelle achieves the desired distortion of air to provide the turbomachine with a more uniform flow.

Some turbomachine designs, however, include nacelles having a geometry that ineffectively stabilizes and smoothes uneven air pressure distributions. A flow stability enhancement device is often added to such nacelles. In these designs, the flow stability enhancement device helps stabilize and smooth uneven air pressure distributions rather than relying exclusively on the geometry of the nacelle.

Boundary layer blowing devices and boundary layer suction devices are example flow stability enhancement devices. Boundary layer blowing devices require a supply of compressed air. Boundary layer suction devices require a vacuum pump. Operating such devices affects the efficiency of the turbomachine.

SUMMARY

A method of controlling a flow enhancement device according to an exemplary aspect of the present disclosure includes, among other things, providing a flow enhancement device that is configured stabilize a flow of air near a nacelle. The flow enhancement device has a first setting and a second setting that provides more stabilization than the first setting. The method also includes monitoring parameters of a turbomachine to determine the stability of the flow of air near the nacelle, and adjusting the flow enhancement device between the first setting and the second setting based on the monitoring In a further non-limiting embodiment of the foregoing method of controlling a flow enhancement device, the first setting may correspond to a flow enhancement device that provides no stabilization In a further non-limiting embodiment of either of the foregoing methods of controlling a flow enhancement device, the adjusting may include selectively increasing or decreasing the flow enhancement device between the first setting and the second setting.

In a further non-limiting embodiment of any of the foregoing methods of controlling a flow enhancement device, the flow enhancement device may comprise a boundary layer blowing device.

In a further non-limiting embodiment of any of the foregoing methods of controlling a flow enhancement device, the flow enhancement device may comprise a boundary layer suction device.

In a further non-limiting embodiment of any of the foregoing methods of controlling a flow enhancement device, the turbomachine may be a gas turbine engine.

In a further non-limiting embodiment of any of the foregoing methods of controlling a flow enhancement device, the method may include using the parameters to establish an inlet stability and distortion parameter that quantifies the distortion of the flow of air, and adjusting the flow enhancement device based on the inlet stability and distortion parameter.

A method of controlling a flow of air entering a fan section of a turbomachine according to another exemplary aspect of the present disclosure includes, among other things, influencing a flow of air near a nacelle of a turbomachine to compensate for a distortion of the flow of air, and adjusting the influencing during operation of the turbomachine based on operating conditions of the turbomachine.

In a further non-limiting embodiment of the foregoing method of controlling a flow of air entering a fan section of a turbomachine, the influencing may comprise directing air from a compressed air supply through an arrangement of apertures established in the nacelle, the air moving through the apertures radially inwardly toward an axis established by the nacelle In a further non-limiting embodiment of either of the foregoing methods of controlling a flow of air entering a fan section of a turbomachine, the influencing may comprise drawing air radially away from an axis though an arrangement of apertures established in the nacelle.

In a further non-limiting embodiment of any of the foregoing methods of controlling a flow of air entering a fan section of a turbomachine, the adjusting may comprise activating or deactivating a flow enhancing device.

In a further non-limiting embodiment of any of the foregoing methods of controlling a flow of air entering a fan section of a turbomachine, the operating conditions may be used to establish an inlet stability and distortion parameter that quantifies the distortion of the flow of air. The adjusting may be based on the inlet stability and distortion parameter.

A turbomachine control arrangement according to another exemplary aspect of the present disclosure includes, among other things, a nacelle of a turbomachine, a flow enhancement device configured to selectively influence a flow of air near the nacelle, and a controller configured to adjust an amount of influence provided by the flow enhancement device.

In a further non-limiting embodiment of the foregoing turbomachine control arrangement, the flow enhancement device may comprise an arrangement of apertures established in the nacelle. The apertures may be configured to communicate air radially inwardly toward an axis established by the nacelle to influence the flow of air through the nacelle.

In a further non-limiting embodiment of the foregoing turbomachine control arrangement, the compressed air supply may provide the air that is communicated through the apertures.

In a further non-limiting embodiment of the foregoing turbomachine control arrangement, the flow enhancement device may comprise an arrangement of apertures established in the nacelle, the apertures configured to communicate air radially away from an axis established in the nacelle to influence the flow of air through the nacelle.

In a further non-limiting embodiment of the foregoing turbomachine control arrangement, the controller may adjust the flow enhancement device to provide more influence over the flow of air when the air entering the nacelle is less stable than when the air entering the nacelle is more stable.

In a further non-limiting embodiment of the foregoing turbomachine control arrangement, the turbomachine may be a gas turbine engine.

These and other features of the disclosed examples can be best understood from the following specification and drawings, the following of which is a brief description.

DETAILED DESCRIPTION

Figure 1:
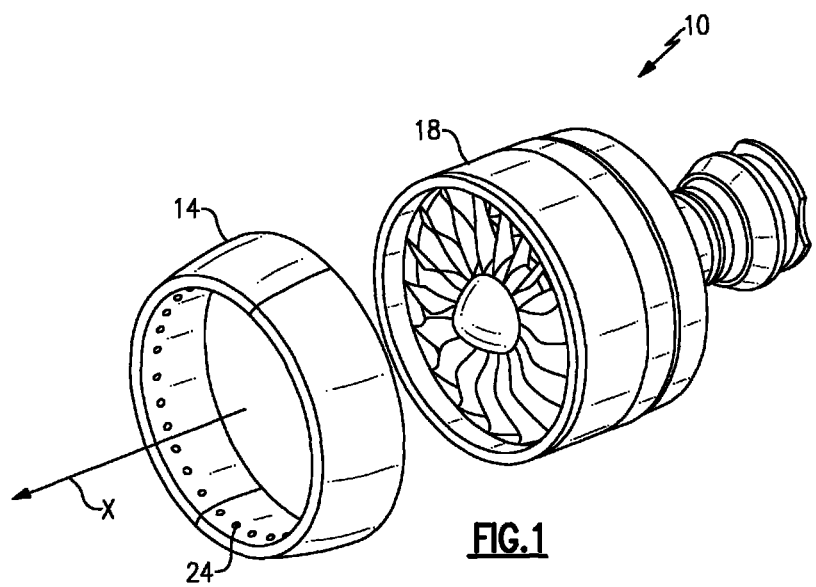
FIG. 1 shows a partially exploded perspective view of an example turbomachine that has a flow enhancement device.
Figure 2:
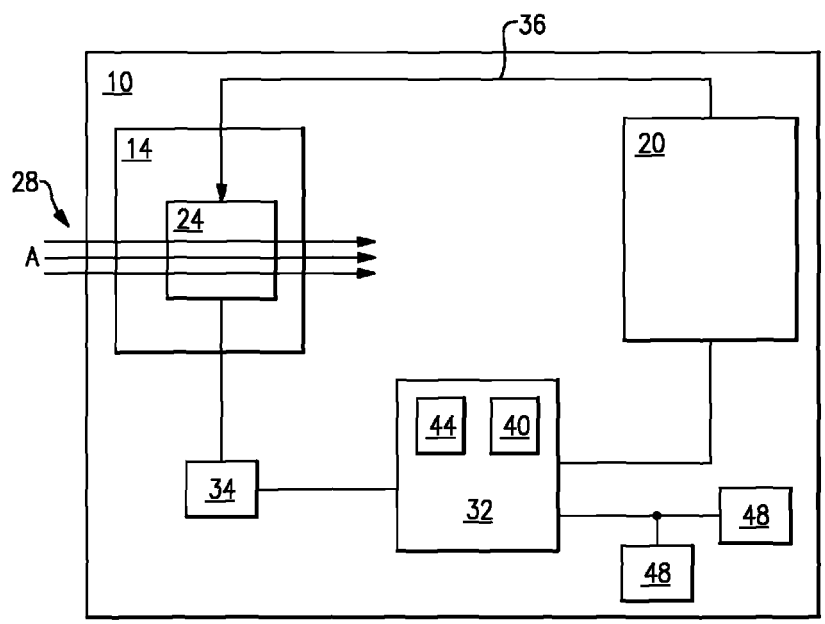
FIG. 2 shows a schematic view of the FIG. 1 turbomachine.

Referring to FIGS. 1 and 2, an example turbomachine 10 is an engine used to propel an aircraft (not shown). In this example, the turbomachine 10 is a gas turbine engine that includes a nacelle 14 mounted adjacent a fan section 18. Both the nacelle 14 and the fan section 18 are circumferentially disposed about an engine axis X.

During operation, air is pulled into the turbomachine 10 by the fan section 18. The air is then pressurized, mixed with fuel, and burned in a combustor. Turbines of the turbomachine 10 extract energy from the hot combustion gases flowing from a combustor of the turbomachine. The compressed air is stored in a compressed air supply 20, which may include bleed air from the fan section 18. Some of the compressed air is then distributed throughout the aircraft as is known.

In this example, some of the compressed air in the compressed air supply 20 is communicated to a flow enhancement device 24 at least partially established within the nacelle 14. The example flow enhancement device 24 is configured to influence a flow of air 28 moving through the nacelle 14 into the fan section 18 of the turbomachine 10. Influencing the flow of air 28 includes, for example, stabilizing and smoothing uneven air pressure distributions in the flow of air 28. A person having skill in this art and the benefit of this disclosure would understand the benefits associated with influencing the flow of air 28 through the nacelle 14 using the flow enhancement device 24.

The example flow enhancement device 24 is a boundary layer blowing device that communicates a small amount of air from the compressed air supply 20 through an arrangement of apertures established in the nacelle 14. The air moves through the apertures toward the axis X. In another example, the flow enhancement device 24 is a boundary layer suction device that pulls air radially away from the axis X. A vacuum pump (not shown) could be used to power such a boundary layer suction device. Still other examples include other types of flow enhancement devices.

In this example, controller 32 controls a flow of compressed air 36 from the compressed air supply 20 to the flow enhancement device 24. The controller 32 adjusts a valve 34 to control the flow of compressed air 36 in this example. The example controller 32 includes a memory portion 40 and a processor 44. The processer 44 is configured to execute a program stored in the memory portion 40.

Figure 3:
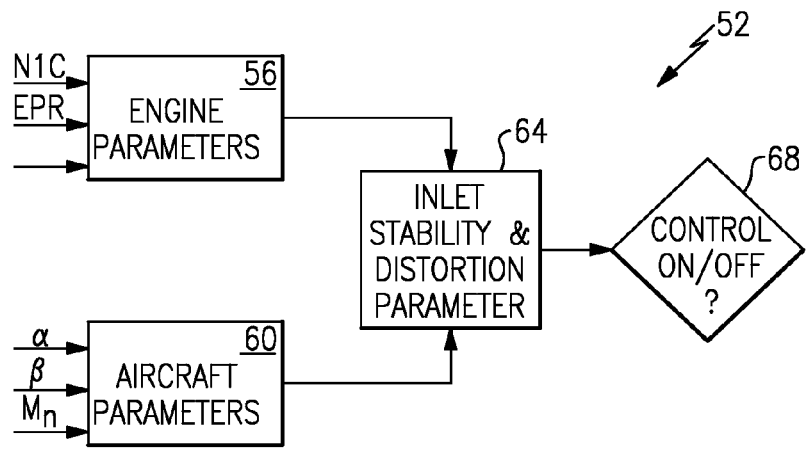
FIG. 3 shows a flow of an example method used to control the flow enhancement device in the FIG. 1 turbomachine.

Referring to FIG. 3 with continuing reference to FIGS. 1 and 2, a flow enhancement device control program 52 utilizes data collected from the aircraft. Data utilized by the program 52 may be collected by various means. A plurality of sensors 48, for example, may be used to provide data to the controller 32.

In this example, the program 52 executed by the processor 44 receives engine parameters 56 as inputs. Example engine parameters 56 includes a corrected rotational speed (N1C) and an engine pressure ratios (EPR). These parameters are typically referred to as the thrust command. Other parameters could be included as well.

The program 52 also receives aircraft parameters 60 as inputs. Example aircraft parameters 60 include an angle of attack α, a side-to-side command or yaw β, and a Mach number $M_n$. The aircraft parameters 60 are typically parameters that are used to control the dynamics of flight. The aircraft parameters 60 could include other information as is known.

Providing the engine parameters 56 and the aircraft parameters 60 enables the processer 44 to establish an inlet stability and distortion parameter at a step 64. The program 52 determines whether the flow enhancement device 24 should be activated or deactivated at a decision step 64.

In one example, the program 52 the turns the flow enhancement device 24 on or off at a step 68. The inlet stability and distortion parameter effectively quantifies the needed amount of flow enhancement.

In some examples, the effect of the flow enhancement device 24 is varied based on the inlet stability and distortion parameter from the step 64. That is, the flow enhancement device 24 may be adjusted to alter the flow a relatively small amount or a relatively large amount depending on the inlet stability and distortion parameter.

In one example, the flow enhancement device 24 is not needed when the turbomachine 10 (and the aircraft) are at a cruising altitude.

Many computing devices can be used to implement various functions described herein. For example, the controller 32, which includes the processor 44 and the memory portion 40, may comprise a portion of a dual architecture micro server card.

In terms of hardware architecture, the controller 32 can additionally include one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as additional controllers, buffers (caches), drivers, repeaters, and receivers to enable communications. Further, the local interface may include address, control, and/or data connections to enable appropriate communications among the aforementioned components.

The example processor 44 used in the controller 32 executes software code, particularly software code stored in the memory portion 40. The processor 44 can be a custom made or commercially available processor, a central processing unit (CPU), an auxiliary processor among several processors associated with the computing device, a semiconductor based microprocessor (in the form of a microchip or chip set) or generally any device for executing software instructions.

The memory portion 40 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory portion 40 may include one or more additional or separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Figure 4:
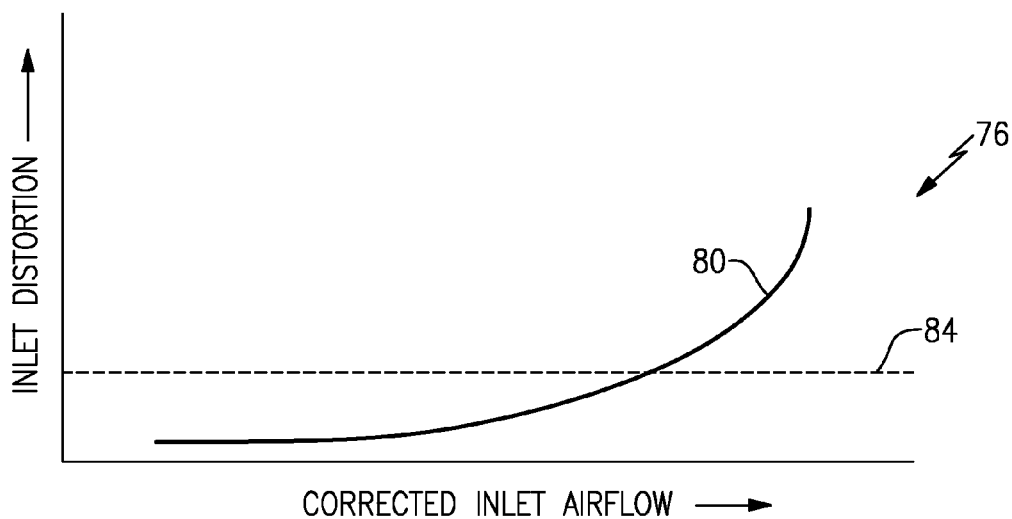
FIG. 4 graphically shows the performance of the FIG. 1 turbomachine.

Referring to FIG. 4 with continuing reference to FIGS. 2 and 3, information from a performance chart 76 may be used by the inlet stability and distortion parameter at the step 64 to determine when to activate (or deactivate) the flow enhancement device 24.

The performance chart 76 shows a performance curve 80 of the turbomachine 10 at a given angle of attack α, crosswind velocity β, and mach number $M_n$. The flow enhancement device 24 is activated when the curve 80 exceeds a threshold value 84. That is, the flow enhancement device 24 is activated when the inlet distortion is above the threshold value 84. When the inlet distortion is below the threshold value 84, the flow enhancement device 24 is deactivated.

Features of the disclosed examples include avoiding parasitic losses associated with flow enhancement devices by shutting these devices off when not required.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A method of controlling a flow enhancement device, comprising:
 providing a flow enhancement device that is configured stabilize a flow of air near a nacelle, the flow enhancement device having a first setting and a second setting that provides more stabilization than the first setting;
 monitoring parameters of a turbomachine to determine the stability of the flow of air near the nacelle;
 using the parameters to establish an inlet stability and distortion parameter that quantifies the distortion of the flow of air; and
 adjusting the flow enhancement device between the first setting and the second setting based on the inlet stability and distortion parameter.

2. The method of claim 1, wherein the first setting corresponds to a flow enhancement device that provides no stabilization.

3. The method of claim 1, wherein the adjusting includes selectively increasing or decreasing the flow enhancement device between the first setting and the second setting.

4. The method of claim 1, wherein the flow enhancement device comprises a boundary layer blowing device.

5. The method of claim 1, wherein the flow enhancement device comprises a boundary layer suction device.

6. The method of claim 1, wherein the turbomachine is a gas turbine engine.

7. A method of controlling a flow of air entering a fan section of a turbomachine, comprising:
 influencing a flow of air near a nacelle of a turbomachine to compensate for a distortion of the flow of air; and
 adjusting the influencing during operation of the turbomachine based on an inlet stability and distortion parameter that quantifies the distortion of the flow of air, the inlet stability and distortion parameter based on operating conditions of the turbomachine.

8. The method of claim 7, wherein the influencing comprises directing air from a compressed air supply through an arrangement of apertures established in the nacelle, the air moving through the apertures radially inwardly toward an axis established by the nacelle.

9. The method of claim 7, wherein the influencing comprises drawing air radially away from an axis though an arrangement of apertures established in the nacelle.

10. The method of claim 7, wherein the adjusting comprises activating or deactivating a flow enhancing device.

11. A turbomachine control arrangement, comprising:
 a nacelle of a turbomachine;
 a flow enhancement device configured to selectively influence a flow of air near the nacelle; and
 a controller configured to adjust an amount of influence provided by the flow enhancement device in response to an inlet stability and distortion parameter that quantifies a distortion of a flow of air based on monitored parameters of the turbomachine.

12. The turbomachine control arrangement of claim 11, wherein the flow enhancement device comprises an arrangement of apertures established in the nacelle, the apertures configured to communicate air radially inwardly toward an axis established by the nacelle to influence the flow of air through the nacelle.

13. The turbomachine control arrangement of claim 12, wherein a compressed air supply provides the air that is communicated through the apertures.

14. The turbomachine control arrangement of claim 11, wherein the flow enhancement device comprises an arrangement of apertures established in the nacelle, the apertures configured to communicate air radially away from an axis established in the nacelle to influence the flow of air through the nacelle.

15. The turbomachine control arrangement of claim 11, wherein the controller adjusts the flow enhancement device to provide more influence over the flow of air when the air entering the nacelle is less stable than when the air entering the nacelle is more stable.

16. The turbomachine control arrangement of claim 11, wherein the turbomachine is a gas turbine engine.

17. The turbomachine control arrangement of claim 11, wherein the controller is a flow controlling controller.

18. The turbomachine control arrangement of claim 11, wherein the controller forms a portion of a dual architecture micro server card.

\* \* \* \* \*